(12) United States Patent
Dockter et al.

(10) Patent No.: US 6,622,974 B1
(45) Date of Patent: Sep. 23, 2003

(54) GEOMETRIC MORPHING WING WITH EXPANDABLE SPARS

(75) Inventors: Gregory E. Dockter, Mesa, AZ (US); Brian K. Hamilton, Mesa, AZ (US)

(73) Assignee: The Boeing Company, Chicago, IL (US)

( * ) Notice: Subject to any disclaimer, the term of this patent is extended or adjusted under 35 U.S.C. 154(b) by 0 days.

(21) Appl. No.: 10/218,996

(22) Filed: Aug. 14, 2002

(51) Int. Cl.[7] .................................................. B64C 3/44
(52) U.S. Cl. ........................................ 244/219; 244/218
(58) Field of Search ................................ 244/5, 134 A, 244/219, 218

(56) References Cited

U.S. PATENT DOCUMENTS

| | | | | | |
|---|---|---|---|---|---|
| 2,477,852 | A | * | 8/1949 | Bacon | 428/116 |
| 2,616,509 | A | * | 11/1952 | Thomas | 244/218 |
| 3,158,338 | A | * | 11/1964 | Cushman | 244/219 |
| 3,172,621 | A | * | 3/1965 | Erwin | 244/219 |
| 3,957,232 | A | * | 5/1976 | Sebrell | 244/123 |
| 4,284,457 | A | * | 8/1981 | Stonier et al. | 156/237 |
| 4,725,021 | A | * | 2/1988 | Priddy | 244/123 |
| 5,775,249 | A | * | 7/1998 | Samuel | 114/102.23 |
| 5,887,828 | A | * | 3/1999 | Appa | 244/215 |
| 6,045,096 | A | * | 4/2000 | Rinn et al. | 244/219 |
| 6,199,796 | B1 | * | 3/2001 | Reinhard et al. | 244/35 R |
| 6,347,769 | B1 | * | 2/2002 | To et al. | 244/219 |
| 6,375,127 | B1 | * | 4/2002 | Appa | 244/215 |

OTHER PUBLICATIONS

"Herculite Industrial Fabrics" [Online], [retrieved on Dec. 17, 2002], Retrieved from: www.herculite.com/herculite.shtml, p. 2 of 3.*

* cited by examiner

Primary Examiner—Michael J. Carone
Assistant Examiner—David Matz
(74) Attorney, Agent, or Firm—David J. Clement, Esq.; Artz & Artz, P.C.

(57) ABSTRACT

A geometric morphing wing 12 is provided, including a rigid internal core 20 surrounded by an expandable spar 22 and covered by a wing surface overlay 24. The expandable spar 22 includes an elastomeric bladder 30 movable between a non-inflated state 26 and an inflated state 28 such that the airfoil shape 29 of the geometric morphing wing 12 is adjusted.

19 Claims, 6 Drawing Sheets

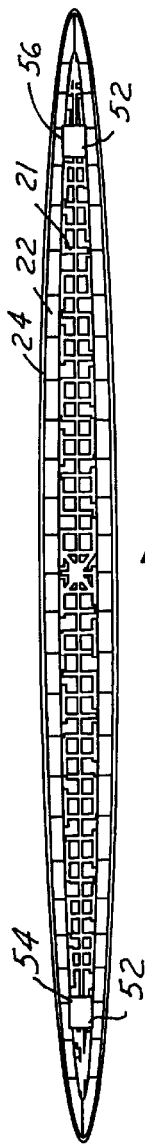
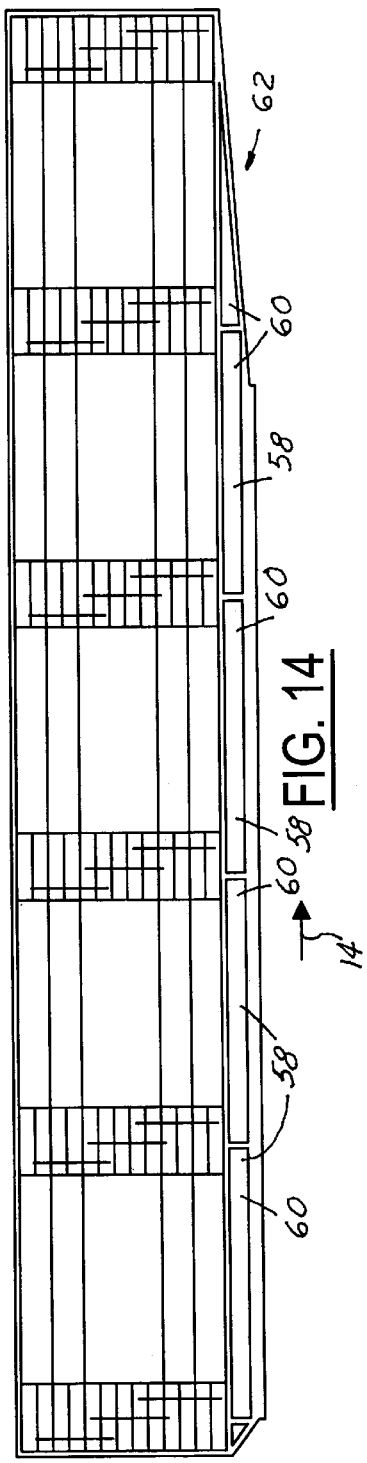
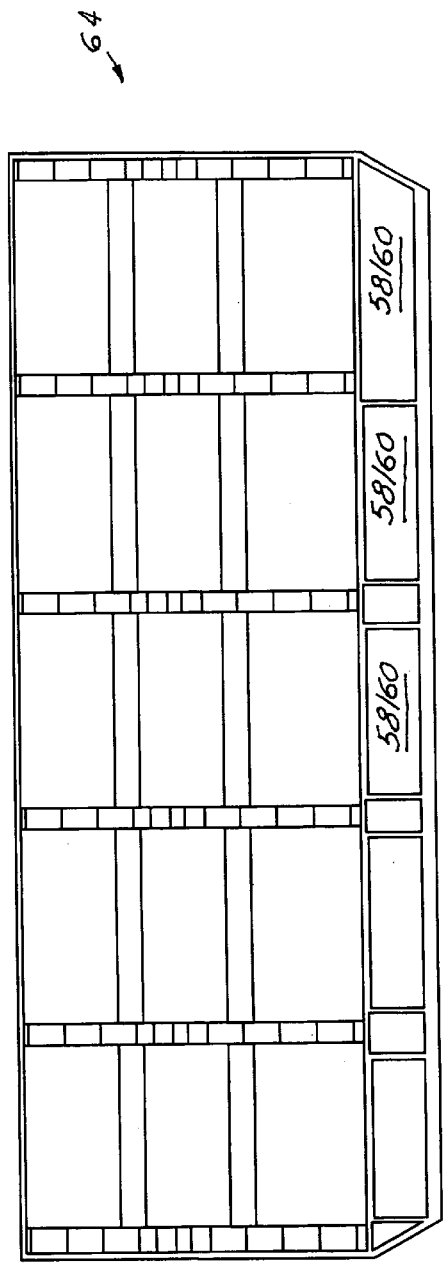
FIG. 13
FIG. 14
FIG. 15

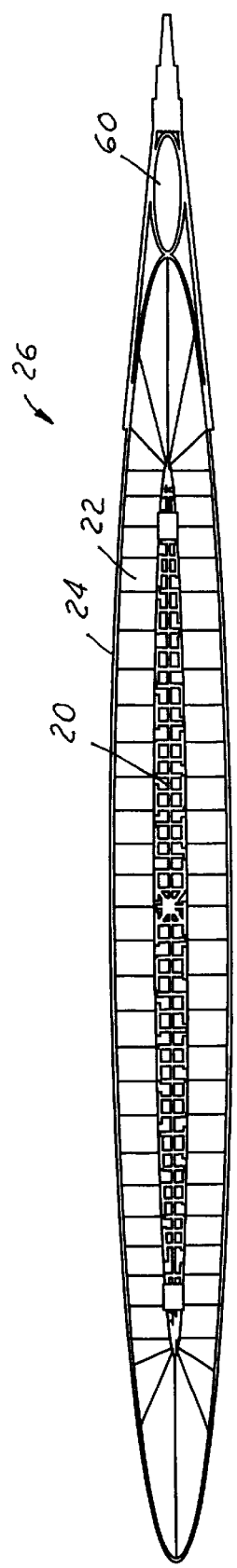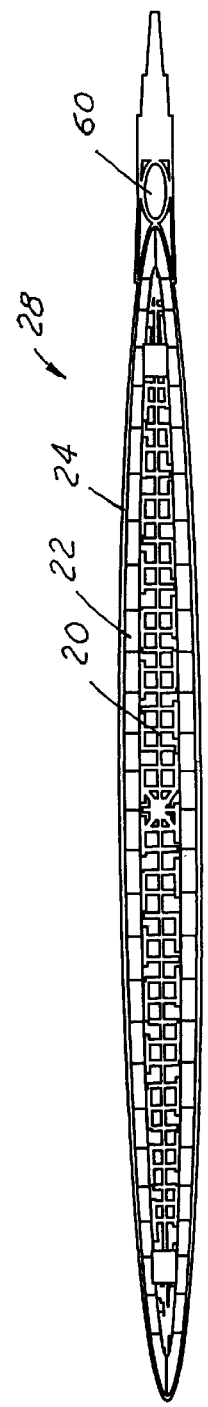
FIG. 16
FIG. 17

GEOMETRIC MORPHING WING WITH EXPANDABLE SPARS

TECHNICAL FIELD

The present invention relates generally to an aircraft wing with a modifiable airfoil, and more particularly to an aircraft wing utilizing expandable spars to modify the airfoil.

BACKGROUND OF THE INVENTION

Current aircraft designs utilize a variety of airfoils on wings, horizontal stabilizers, conards, rotor blades, vertical stabilizers, and a variety of other elements. These elements largely consist primarily of relatively fixed airfoil surfaces. Thus, flying surfaces must commonly be optimized for specific applications such as low speed handling or improved high-speed aerodynamics. Aircraft that must operate in several performance environments must often adopt airfoil surfaces that provide suitable characteristics in multiple environments rather that optimized airfoils for particular flight situations. Such compromised airfoil surfaces may diminish the overall performance of the aircraft as well as diminishing its performance in specific flight conditions.

Current designs often limit modification of the flying surface to that which can be achieved using minimal mechanical moving surfaces. Mechanical actuators and mechanical moving parts are utilized to effectuate minor changes in the airfoil surface to allow for enhanced low-speed flight and limited autopilot maneuvering. Military aircraft have utilized mechanically swept wings for improved aerodynamics during high speed flight. These mechanical surface systems, however, often only provide a very limited ability to affect the airfoil shape and aerodynamic flight characteristics of the aircraft. These limited changes can result in the airfoil being optimized for only a limited range of the flight envelope.

An improved approach would be to optimize the configuration of the airfoil throughout the flight envelope of the aircraft. This would allow the airfoil to be modified for an optimized configuration over most of the flight conditions of the aircraft. An optimized airfoil could support greater weights at lower speeds to allow greater take-off weight while providing lower drag and better lift characteristics at high speed to achieve a greater range. Thus an airfoil capable of optimization throughout the flight envelope could provide significant improvements to aircraft performance. Such a modifiable airfoil would require greater control over the airfoil shape than provided by known limited mechanical surface designs. It would therefore be highly desirable to have an aircraft wing with a modifiable airfoil capable of greater optimization throughout the flight envelope than provided by previous methodologies.

SUMMARY OF THE INVENTION

It is, therefore, an object of the present invention to provide an airfoil with a configuration that can be optimized throughout the flight envelope of an aircraft. It is a further object of the present invention to provide an aircraft wing with a modifiable airfoil capable of being optimized throughout the flight envelope.

In accordance with the objects of the present invention, a geometric morphing wing is provided. The geometric morphing wing includes a rigid internal core. An expandable spar surrounds the rigid internal core and is comprised of a plurality of elastomeric bladders. An external fiber mesh overlay covers the plurality of elastomeric bladders to provide a smooth wing surface. The plurality of elastomeric bladders are expandable through the introduction of increased air pressure such that the profile of the geometric morphing wing can be modified.

Other objects and features of the present invention will become apparent when viewed in light of the detailed description of the preferred embodiment when taken in conjunction with the attached drawings and appended claims.

BRIEF DESCRIPTION OF THE DRAWINGS

FIG. 13 is a side-view illustration of the expandable spars illustrated in FIG. 10;

FIG. 14 is a top-view illustration of an embodiment of an expandable spar in accordance with the present invention, the embodiment illustrating an expandable chord bladder and illustrated in the non-inflated or low-inflated state;

FIG. 15 is a top-view illustration of an embodiment of expandable spars illustrated in FIG. 14, the expandable spar illustrated in the inflated state;

FIG. 16 is a side-view illustration of the expandable spars illustrated in FIG. 14; and FIG. 17 is a side-view illustration of the expandable spars illustrated in FIG. 15.

DESCRIPTION OF THE PREFERRED EMBODIMENT(S)

Figure 1:
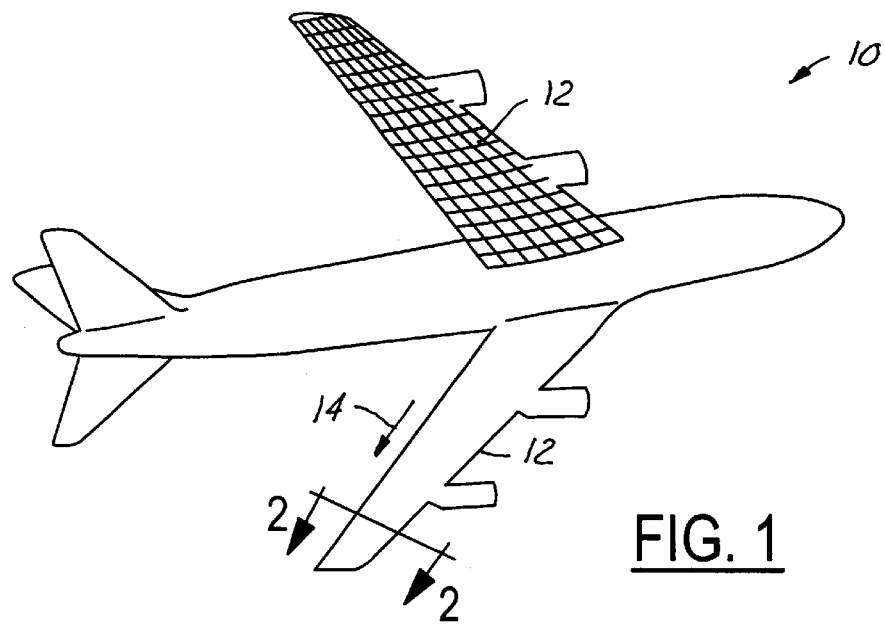
FIG. 1 is an illustration of an aircraft as intended for use with an embodiment of the present invention.

Referring now to FIG. 1, which is an illustration of an aircraft 10 as intended for use with the present invention.

The present invention provides a geometric morphing wing 12 for use on such an aircraft 10 in order to provide a flying surface adaptable to multiple flight conditions. It should be understood that although the term "wing" will be utilized throughout this application and is illustrated in FIG. 1 in its most common usage, the term is not intended as a limitation on the present invention. The term "wing" is intended to encompass any aircraft airfoil surface including, but not limited to, wings, horizontal stabilizers, canards, rotor blades, and vertical stabilizers.

Figure 2:
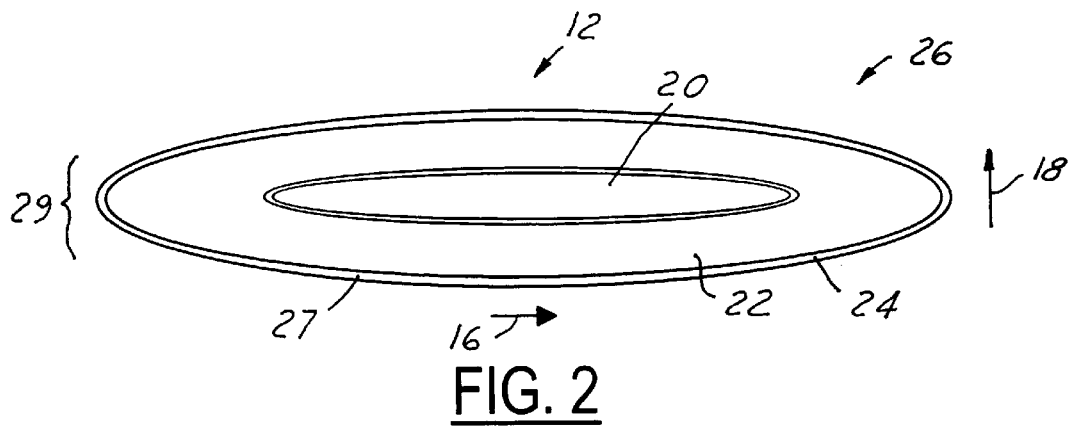
FIG. 2 is a cross-sectional illustration of an embodiment of a geometric morphing wing in accordance with the present invention, the cross-section illustrating the geometric morphing wing in the non-inflated or low-inflated state.
Figure 3:
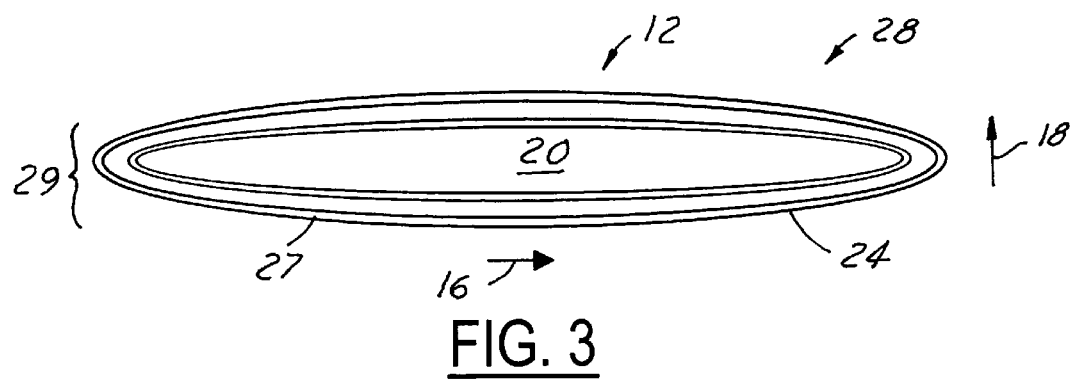
FIG. 3 is a cross-sectional of the geometric morphing wing illustrated in FIG. 2, the geometric morphing wing illustrated in the inflated state.

The geometric morphing wing 12 is capable of being modified for an optimized airfoil over most of the flight condition of forward flight. Alterations in span 14, chord 16, and/or camber 18 (see FIG. 2) can be utilized to change the lift and drag characteristics of the geometric morphing wing 12. The present invention allows for such alterations by including a rigid internal core 20, such as a core fiber honeycomb 21 (see FIG. 8), surrounded by an expandable spar 22. A wing surface overlay 24 can be utilized to make the wing surface 26 smooth and to minimize ripples and may be constructed of a variety of materials although an overlay mesh 27 of elastomer 32 and fiber 34 is preferable, referred to as geometric morphing wing. The advantage of the rigid internal core 20 and expandable spar 22 combination is that it provides an adjustable airfoil shape 29. The rigid internal core 20 maintains the wing shape while the expandable spar 22 allows for adjustment of span 14, chord, and or camber 18. By adjusting the air pressure within the expandable spar 22 the airfoil can be adjusted from a non-inflated state 26 (FIG. 2) to an inflated state 28 (FIG. 3) or any number of positions in between. This allows for a greater control and optimization of the airfoil shape and therefore improved performance over a greater range of flight conditions.

Figure 4:
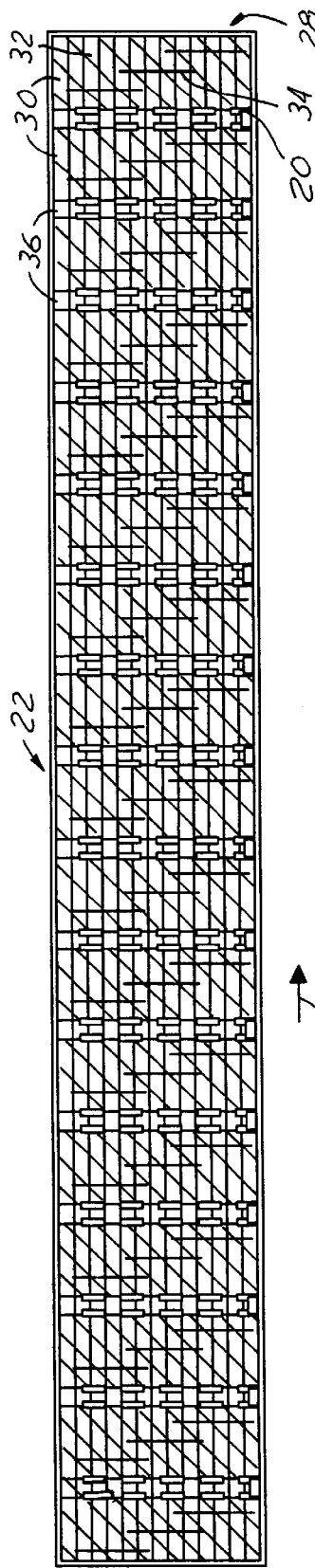
FIG. 4 is a top-view illustration of the internal structure of the elastomeric spars of the geometric morphing wing illustrated in FIG. 3.
Figure 5:
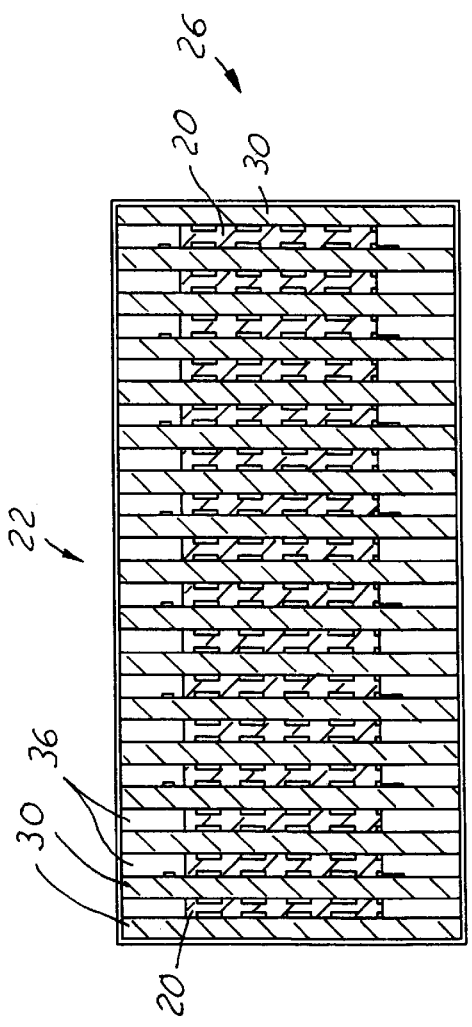
FIG. 5 is a top-view illustration of the internal structure of the elastomeric spars of the geometric morphing wing illustrated in FIG. 2.
Figure 6:
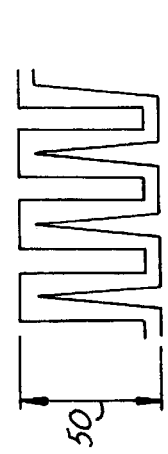
FIG. 6 is a detail illustration of another type of elastomeric bladder for use in the geometric wing illustrated in FIG. 2.

Although it is contemplated that the expandable spar 22 may be formed in a variety of configurations, one embodiment illustrated in FIGS. 4 and 5 contemplates the expandable spar 22 to comprise a plurality of elastomeric bladder portions 30. It is further contemplated that the elastomeric bladder portions 30 can be constructed using a variety of materials, although an elastomer 32 and fiber 34, such as fiber mesh, combination is preferable. Expansion pockets 36 positioned between adjoining elastomeric bladder portions 30 can be utilized to control the expansion profile of the expandable spar 22 as well as insure adequate rigidity of the expandable spar 22 in all states of inflation. The elastomer 32 and fiber mesh 34 walls utilized to form each of the elastomeric bladder portions 30 further insures adequate rigidity in the adjustable expandable spar 22. Although the elastomeric bladder portions can be formed in a variety of fashions, a single air bladder with a designed shape with low or non-inflation and another shape that is expanded in the inflated state as illustrated. Other options could take the form of a fold elastomeric bladder 38 as illustrated in FIG. 6.

The plurality of elastomeric bladder portions 30 preferably expand from a non-inflated state 26 (see FIG. 5) in the spanwise direction 14 to an inflated state 28 (see FIG. 4). As the elastomeric bladder portions 30 expand in the span direction 14 due to increase air pressure, the chord 16 and camber 18 are reduced (see FIG. 3). In one embodiment, the elastomeric bladders portions 30 are designed to reduce in chord 16 and camber 18 and increase in span 14 at the same rate such that the airfoil shape changes proportionally even at higher inflated conditions. The number, dimensional characteristics, and physical makeup (elastomer 32 and fiber 34 makeup) can all be modified to create a variety of aerodynamic profiles as the expandable spar 22 is moved between the non-inflated state 26 and an inflated state 28.

Similarly, although the elastomeric bladder portions 30 preferably expand in the span 14 while reducing chord 16 and camber 18 when exposed to increased air pressure, in alternate embodiments it is contemplated that the expansion/contraction of the elastomeric bladder portions 30 may be accomplished in a variety of directions as a response to change in bladder pressure of the fold elastomeric bladder 38.

Figure 7:
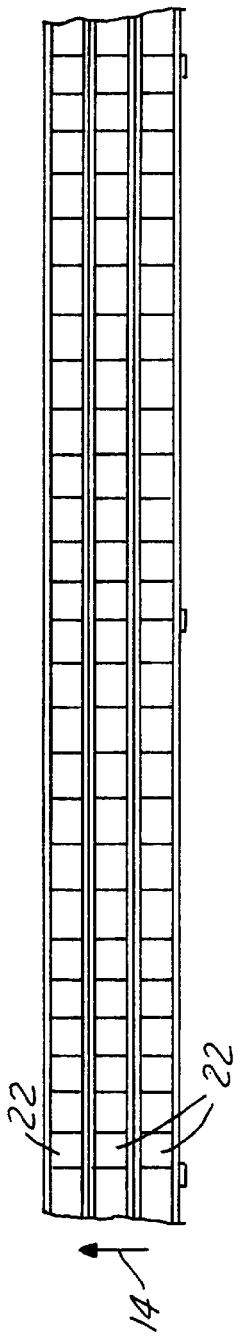
FIG. 7 is a top-view illustration of an embodiment of the elastomeric spars in a geometric morphing wing in accordance with the present invention, the geometric morphing wing illustrating a plurality of expandable spars.

Although the geometric morphing wing 12 has thus far been described in relation to a single expandable spar 22, the present invention may in fact employ a plurality of expandable spars 4A as illustrated in FIG. 7. The plurality of expandable spars 40 provides a variety of improvements over the single spar design. Failure of a single expandable spar 22 or even multiple spars can be realized without effecting the safety of the geometric morphing wing 12. Furthermore, geometric properties and expansion qualities of each of the single expandable spars 22 may be individually designed such that the airfoil characteristics of the geometric morphing wing 12 can be optimized for a variety of flight characteristics. It is contemplated that the plurality of expandable spars 40 may be attached to one another through a variety of methodologies including, but not limited to, mechanical, glued or stitched configurations.

Figure 8:
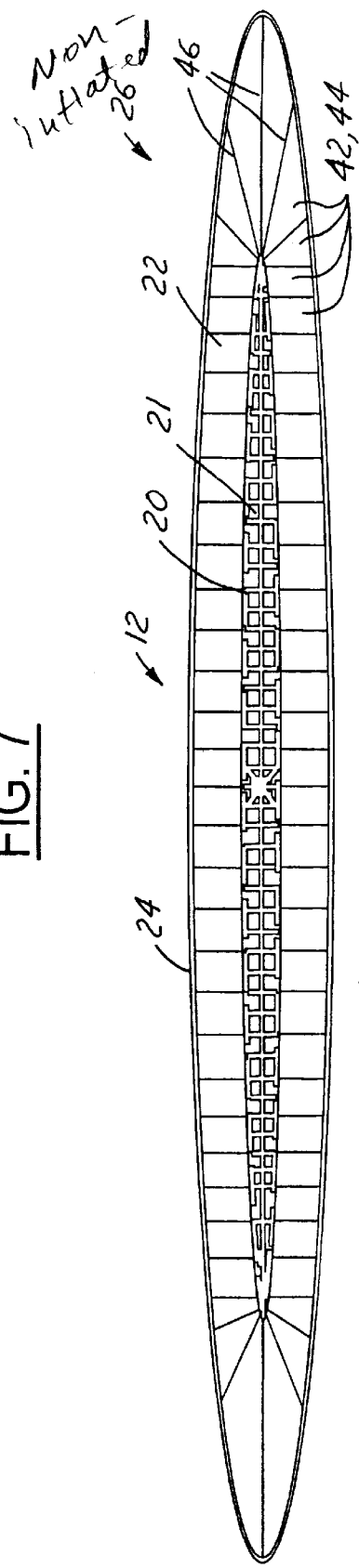
FIG. 8 is a side view illustration of the elastomeric spars illustrated in FIG. 7, the geometric morphing wing illustrating the plurality of expandable spars in the non-inflated or low-inflated state.
Figure 9:
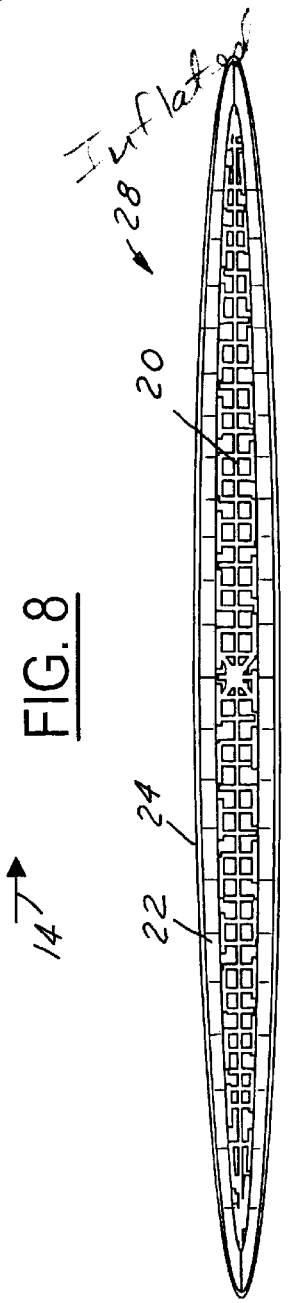
FIG. 9 is a side view illustration of the expandable spars illustrated in FIG. 7, the expandable spars illustrated in the inflated state.
Figure 10:
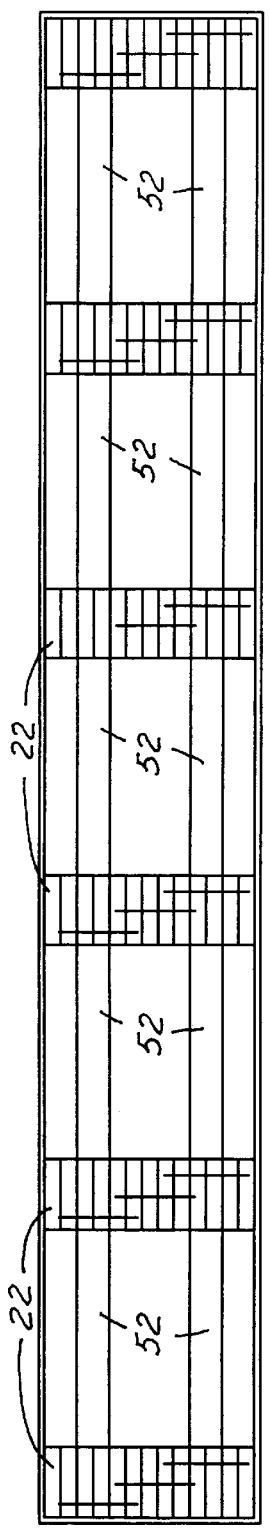
FIG. 10 is a top-view illustration of the expandable spars illustrated in FIG. 11, the expandable spars illustrated in the inflated state.
Figure 11:
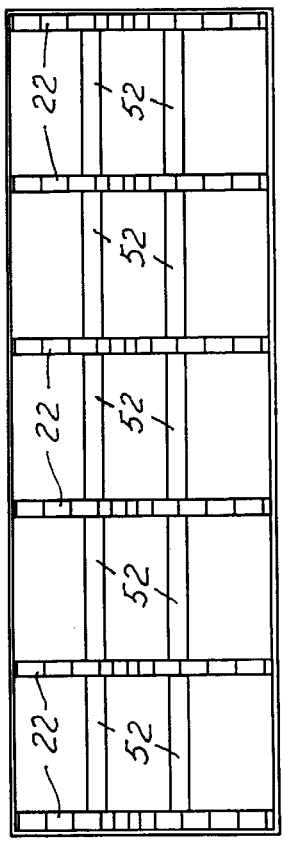
FIG. 11 is a top-view illustration of an embodiment of the expandable spars in accordance with the present invention, the geometric morphing wing including fixed length spars and illustrated in the non-inflated or low inflated state.
Figure 12:
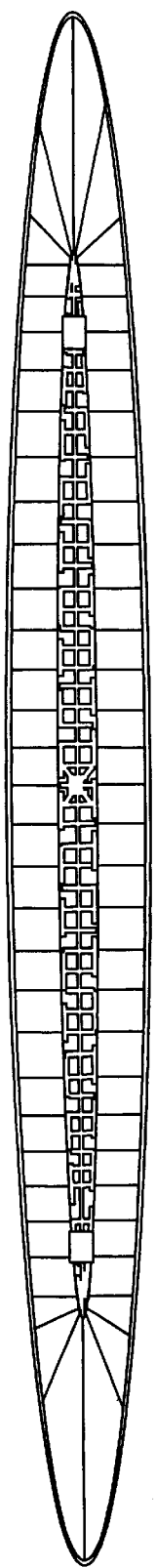
FIG. 12 is a side-view illustration of the expandable spars illustrated in FIG. 11.

FIGS. 8 and 9 illustrated the bladder sidewalls 42 of the elastomeric bladder 38 in the non-inflated state 26 and the inflated state 28 respectively. The bladder sidewalls 42 are preferably reinforced fiber bladder sidewalls 44 containing a reinforced fiber matrix 46. The fiber 34 in the reinforced fiber bladder sidewalls 44 can thereby be configured to maintain the shape of the airfoil. The reinforced fiber bladder sidewalls 44 can also be utilized to prevent the expandable spar 22 from increasing beyond its design limits. The use of reinforced fiber can also strengthen the construction and allow elements to be built with less material. Finally, in one embodiment it is contemplated that the reinforced fiber bladder sidewalls 44 are non-expandable bladder sidewalls 44 such that the expansion of the expandable spar 22 in the span direction 14 is limited by the fold height 50, or sidewall height 50, of the fold elastomeric bladder (see FIG. 6).

Although the plurality of expandable spars 40 may be directly affixed to one another, it is also contemplated that they can be separated at a distance from one another through the use of fixed spars 52 positioned between neighboring expandable spars 22 as illustrated in FIGS. 10–13. Although any number of fixed spars 52 may be utilized, a forward fixed spar 54 and a rearward fixed spar 56 positioned in the span direction 14 are preferable. The use of the fixed spars 52 can provide increased stiffness to the geometric morphing wing 12 while still allowing expansion/contraction. Additionally, the use of fixed spars 52 may be utilized to cost effectively modify the characteristics and proportional range of the geometric morphing wing 12.

The present invention may further include additional bladder elements 58 as illustrated in FIGS. 14–17. Additional bladder elements 58 can be created in different patterns to effectuate wing twist, sweep angle, or other aerodynamic characteristics. Although the additional bladder elements 58 may be utilized for a wide variety of effects, one embodiment contemplates the use of expandable chord bladders 60. These expandable chord bladders 60 can be utilized to change only the chord of the geometric morphing wing 12 by orientating it in the span direction 14 and expanding it in the chord direction 16. In other embodiments they could expand in the camber direction 18 to further alter lift characteristics. These chord bladders 60 also are movable between a chord bladder non-inflated state 62 (FIG. 16) and a chord bladder inflated state 64 (FIG. 17). Although chord bladders 60 have been illustrated, a wide variety of additional bladder elements 58 are contemplated by the present invention.

While particular embodiments of the invention have been shown and described, numerous variations and alternative embodiments will occur to those skilled in the art. Accordingly, it is intended that the invention be limited only in terms of the appended claims.

What is claimed is:

1. A geometric morphing wing comprising:
   a rigid internal core;
   at least one expandable spar surrounding said rigid internal core, said at least one expandable spar comprising an elastomeric bladder movable between an inflated state and a non-inflated state, said elastomeric bladder is expanded in a spanwise direction as said elastomeric bladder moves from said non-inflated state to said inflated state, said elastomeric bladder reduces in a chord direction and a camber direction when said elastomeric bladder expands in said spanwise direction; and
   a wing surface overlay covering said at least one expandable spar to form an airfoil shape, said airfoil shape adjustable by moving said elastomeric bladder between said inflated state and said non-inflated state.

2. A geometric morphing wing as described in claim 1, wherein said elastomeric bladder comprises a fold elastomeric bladder.

3. A geometric morphing wing as described in claim 1, wherein said elastomeric bladder reduces in said chord direction, reduces in said camber direction, and expands in said spanwise direction at identical rates such that said airfoil shape changes proportionally as said elastomeric bladder is expanded.

4. A geometric morphing wing as described in claim 1, wherein said at least one expandable spar comprises a plurality of expandable spars.

5. A geometric morphing wing as described in claim 4, wherein said plurality of expandable spars are attached to each other.

6. A geometric morphing wing as described in claim 4, further comprising:
   a plurality of fixed spars positioned between each of said plurality of expandable spars.

7. A geometric morphing wing as described in claim 1, wherein said elastomeric bladder comprises a plurality of reinforced fiber bladder sidewalls including a reinforced fiber matrix.

8. A geometric morphing wing as described in claim 7, wherein said plurality of reinforced fiber bladder sidewalls comprise non-expandable bladder sidewalls limiting expansion of said elastomeric bladder.

9. A geometric morphing wing as described in claim 1, further comprising:
   at least one additional bladder element positioned between said rigid internal core and said wing surface overlay.

10. A geometric morphing wing as described in claim 9, wherein said at least one additional bladder element comprises an expandable chord bladder movable between a chord bladder inflated state and a chord bladder non-inflated state.

11. A geometric morphing wing as described in claim 10, wherein said expandable chord bladder expands in a spanwise direction.

12. A geometric morphing wing as described in claim 1 wherein said rigid internal core comprises a core fiber honeycomb core.

13. A geometric morphing wing comprising:
   a rigid internal core;
   at least one expandable spar surrounding said rigid internal core, said at least one expandable spar comprising a plurality of elastomeric bladders with reinforced fiber sidewalls and a plurality of expansion pockets each of which is positioned between one pair of said plurality of elastomeric bladders, said plurality elastomeric bladders movable between an inflated state and a non-inflated state, said plurality of elastomeric bladders reducing in a chord direction, reducing in a camber direction, and expanding in a spanwise direction as said plurality of elastomeric bladders moves from said non-inflated state to said inflated state; and
   a wing surface overlay including an overlay mesh comprised of elastomer and fiber, said wing surface overlay covering said at least one expandable spar to form an airfoil shape, said airfoil shape adjustable by moving said plurality of elastomeric bladders between said inflated state and said non-inflated state.

14. A geometric morphing wing as described in claim 13, wherein at least one of said plurality of elastomeric bladders comprises a fold elastomeric bladder.

15. A geometric morphing wing as described in claim 13, wherein said at least one expandable spar comprises a plurality of expandable spars.

16. A geometric morphing wing as described in claim 13, wherein said at least one expandable spar comprises a plurality of expandable spars; and further comprising:
   a plurality of fixed spars positioned between each of said plurality of expandable spars.

17. A geometric morphing wing as described in claim 13, wherein at least one of said plurality of elastomeric bladders comprises a plurality of reinforced fiber bladder sidewalls including a reinforced fiber matrix, said plurality of reinforced fiber bladder sidewalls including non-expandable bladder sidewalls limiting expansion of said at least one of said plurality of elastomeric bladders.

18. A geometric morphing wing as described in claim 13, further comprising:
   at least one expandable chord bladder movable between a chord bladder inflated state and a chord bladder non-inflated state.

19. A method of modifying the airfoil shape of a wing surface overlay of a geometric morphing wing comprising:
   expanding an elastomeric bladder positioned between a rigid core surface and the wing surface overlay such that the geometric morphing wing expands in a spanwise direction, said elastomeric bladder reducing in a chord direction and reducing in a camber direction as the geometric morphing wing expands in a spanwise direction.

* * * * *